Aug. 3, 1965  M. V. COLANGELO  3,197,910
FISHING LURE
Filed Oct. 3, 1963
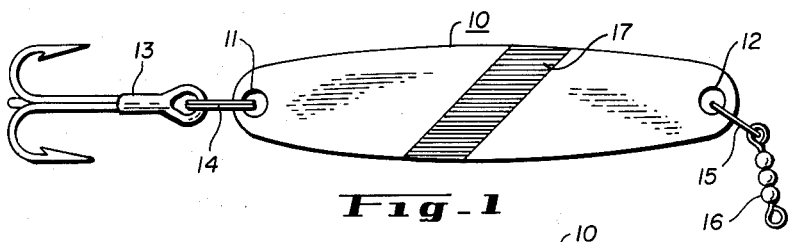
Fig-1
Fig-2
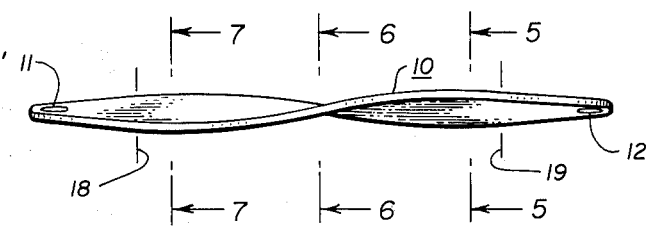
Fig-3
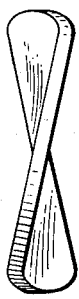  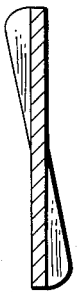 
Fig-4  Fig-5  Fig-6  Fig-7
INVENTOR.
Monte V. Colangelo
BY
ATTORNEYS United States Patent Office 3,197,910
Patented Aug. 3, 1965

3,197,910
FISHING LURE
Monte V. Colangelo, P.O. Box 941, Raton, N. Mex.
Filed Oct. 3, 1963, Ser. No. 313,659
4 Claims. (Cl. 43—42.51)

This application is a continuation-in-part of my co-pending application Serial No. 257,658, filed February 11, 1963; and now abandoned. My invention relates to fishing lures and particularly to an improved lure of the spoon type.

Great numbers of different configurations of spoon type fishing lures have been devised and many have been found effective in catching fish. In addition to the various shapes of the spoons these lures have been provided with many different markings both as to color and design, and many arrangements of spots, stripes and other markings having been used.

Fish appear to be attracted to one lure under certain conditions and to another under others, and it is difficult for a fisherman to anticipate which lure will prove effective on any one day. Consequently, most fishermen find it necessary to carry a selection of different types of lures. Some fishermen acquire an ability to use certain lures more effectively than lures of other types. For example, some lures act in the water in a manner somewhat simulating the movements of a wounded minnow and this type of lure has been found effective in taking fish especially in the hands of an experienced fisherman. In addition to being effective in taking fish, it is desirable that a lure be of simple construction and not easily damaged during use, and further that it be easily manufactured and inexpensive. Accordingly, it is an object of my invention to provide an improved fish lure of the spoon type which is effective in taking fish and is of simple and rugged construction.

It is another object of my invention to provide an improved fish lure of the spoon type providing an irregular or "wounded minnow" action in the water and which is simple and inexpensive.

Briefly, in carrying out the objects of my invention in one embodiment thereof, an elongated generally elliptical piece is formed from flat stock material such as brass and a hole is drilled in each end, one for attaching the swivel and the other the hook. Then the end portions are clamped for a short distance to keep them flat and are twisted with respect to one another to a slight angle about the longitudinal axis, thus putting a slight twist in the central portion. The spoon is then suitably decorated, as by providing a shiny surface and a short 45° stripe in contrasting color in the central portion of one side. A hook is secured on a ring to one end and a swivel on another ring at the other end and the lure is ready for use. This lure is particularly effective when used in trolling and in spinning. Particularly when spin fishing, the fisherman can impart a highly effective action to the lure by using irregular rates of retrieving the lure, the lure itself giving an excellent imitation of the movements of a wounded minnow.

The features of novelty which characterize my invention are pointed out with particularity in the appended claims; my invention itself, however, both as to its construction and manner of operation, together with further objects and advantages thereof, will be better understood upon reference to the following description taken in connection with the accompanying drawing in which:

FIG. 1 is a top plan view of a lure embodying my invention;

FIG. 2 is a bottom plan view of the lure of FIG. 1 with the swivel omitted;

FIG. 3 is a somewhat enlarged side elevation view of the lure of FIG. 1 with the hook and swivel omitted;

FIG. 4 is an end elevation view of the lure as shown in FIG. 3 rotated 90°;

FIG. 5 is a sectional view taken on the line 5—5 of FIG. 3 rotated 90°;

FIG. 6 is a sectional view taken on the line 6—6 of FIG. 3 rotated 90°; and

FIG. 7 is a sectional view taken on the line 7—7 of FIG. 3 rotated 90°.

Referring now to the drawing, the lure illustrated in the plan views, FIGS. 1 and 2, comprises an elongated generally elliptical plate or spoon member 10 which has a length about four and one-half times its greatest width. The ends of the body are provided with holes or openings 11 and 12 so that a treble hook 13 may be connected to one end as shown at the left end of the figures where the hook is shown connected to the opening 11 by a split ring 14. A second split ring 15 has been shown connected in the hole 12 and carries a swivel 16 which may be connected to the fishing line or leader in the usual manner.

The body 10 is preferably made of a material such as brass which may be plated and polished to provide the required silver, copper or other shiny metal effect. In one illustrative embodiment the thickness of the plate material is approximately one tenth of the greatest width of the spoon. I have found the lure very effective when provided with a short cross stripe near the middle thereof as indicated at 17, this stripe being made in a color contrasting with that of the body of the metal, and in the modification illustrated it may, for example, be a black stripe running centrally of the body at an angle of 45° to the longitudinal axis. In the embodiment illustrated no stripe is provided on the underface as shown in FIG. 2.

The body 10 in the finished lure is not flat but rather has a twisted middle portion; the slightly twisted central portion between flat end portions at a slight angle to one another facilitates the securing of the erratic movements simulating the action of a wounded minnow in the water. The details of the twisted configuration of the lure will be more readily apparent on consideration of FIGS. 3 to 7, inclusive. When the lure is being made it is first cut or blanked to an elliptical configuration indicated generally in FIGS. 1 and 2 and then the ends are clamped between flat jaws for a distance approximately 20% of the length of the body 10 at each end, the approximate distance being indicated by the line 18 for the left end and the line 19 for the right end of the lure as shown in FIG. 3.

When the lure has been so clamped, the clamping mechanism is arranged so that one end may be twisted about the longitudinal axis of the lure with respect to the other end so that the end portions will lie at an angle of the order of fifteen degrees with respect to one another about the longitudinal axis; this angle in the drawing, however, has been exaggerated for purposes of illustration and shows the twist as though it were of about twenty-five degrees. This angle is generally indicated in FIG. 4, which is an end view showing the twisted configuration of the lure. It will be observed that this twisting provides a slight twist of the central section of the lure which extends somewhat over one-half the length of the lure. The appearance of the twisted section at three points of the lure is indicated in FIGS. 5, 6 and 7 corresponding to the section lines indicated in FIG. 3.

I have found that this lure when used in fishing for trout, bass and other fresh water fish is very effective in taking fish. The lure, when drawn through the water, provides an action which might be described as swaying and with a wobbling motion. As the lure goes through these motions it will rotate about its longitudinal axis and flashes of light or contrasting color will be given off. Fish appear to be attracted by the flashing action as well as by the wobbling and swaying movement which has the effect of simulating the movements of a wounded minnow.

From the foregoing it is readily seen that the lure is simple in construction and easily manufactured from sheet material. Few tools and fixtures are required, the elliptical body being readily formed by a blanking die made to blank out a flat generally elliptical body which is symmetrical about its central longitudinal and its central transverse axes. The twist is effected by jigs provided with slots to act as retainers for the end pieces together with an arrangement for twisting the slots with respect to one another about the longitudinal axis of the body and provide the twisted central section of the lure. The decoration applied to the lure will vary widely depending upon the type of country in which the lure is used and the desires of the fishermen in the various parts of the country. Furthermore, the decoration may be varied for use depending upon the time of day or other varying conditions during the fishing season. The lure is easily constructed and yet provides an improved effective action which facilitates the taking of fish.

While the invention has been described in connection with specific details, various modifications and other applications will occur to those skilled in the art. Therefore it is not desired that the invention be limited to the specific decorations and tackle connections illustrated and it is intended by the appended claims to cover all modifications which fall within the spirit and scope of the invention.

I claim:

1. A fish lure comprising a body made from a flat piece of sheet metal of elongated generally elliptical configuration, each of the end portions of said body being flat and extending a substantial distance of about twenty percent of the length of the body, said end portions being turned with respect to one another by twisting them from the common plane of the flat piece to an acute angle about the central longitudinal axis of the body to twist the body intermediate the ends and provide a slightly twisted portion between said flat end portions, said acute angle being sufficiently large to render said flat end portions in cooperation with said twisted portion effective to produce swaying of said body with a wobbling motion when said body is drawn through the water, means for attaching a line to one end of said body, and means for attaching a fishhook to the other end thereof.

2. A fish lure comprising a body made from a piece of sheet metal of elongated generally elliptical configuration, each of the end portions of said body being flat and extending a substantial distance of about twenty percent of the length of the body, said end portions being turned with respect to one another about the central longitudinal axis of the body at an angle of the order of fifteen degrees and the body thereby having a twisted portion between said end portions, means for attaching a line to one end of said body, and means for attaching a fishhook to the other end thereof.

3. A fish lure comprising a body made from a piece of sheet metal of elongated generally elliptical configuration, each of the end portions being flat and each extending a distance of the order of twenty percent of the length of the body, said end portions being turned with respect to one another about the central longitudinal axis of the body so that their planes lie at an angle of the order of fifteen degrees with respect to one another whereby said body has a twisted portion between said end portions, said body having a bright metallic surface and one side thereof being provided with a band in a color contrasting with that of the bright surface extending at an angle across the surface thereof, means for attaching a line to one end of said body, and means for attaching a fishhook to the other end thereof.

4. A fish lure comprising a body made from a piece of sheet metal of elongated generally elliptical configuration, the length of said body being approximately four and one-half times the width thereof, each of the end portions being flat and extending a distance of the order of twenty percent of the length of the body, said end portions being turned with respect to one another about the central longitudinal axis of the body so that their planes lie at an angle of the order of fifteen degrees with respect to one another whereby said body has a twisted portion between said end portions, said body having a bright metallic surface and one side thereof being provided with a band in a color contrasting with that of the bright surface extending at an angle across the surface thereof, means for attaching a line to one end of said body, and means for attaching a fishhook to the other end thereof.

References Cited by the Examiner

UNITED STATES PATENTS

| 1,669,350 | 5/28 | Sebenius | 43—42.5 |
| 2,003,976 | 6/35 | Raymond | 43—42.35 X |
| 2,236,023 | 3/41 | Turner | 43—42.51 X |
| 2,819,552 | 1/58 | Russell | 43—42.51 X |

FOREIGN PATENTS 643,449   6/62   Canada.

SAMUEL KOREN, *Primary Examiner.*

ABRAHAM G. STONE, *Examiner.*